United States Patent
Zhang et al.

(10) Patent No.: US 9,899,880 B2
(45) Date of Patent: Feb. 20, 2018

(54) POWER RECEIVER, RESONANCE-TYPE CONTACTLESS POWER SUPPLY AND CONTROL METHOD THEREFOR

(71) Applicants: Wang Zhang, Hangzhou (CN); Feng Yu, Hangzhou (CN)

(72) Inventors: Wang Zhang, Hangzhou (CN); Feng Yu, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

(21) Appl. No.: 15/080,663

(22) Filed: Mar. 25, 2016

(65) Prior Publication Data

US 2017/0244282 A1     Aug. 24, 2017

(30) Foreign Application Priority Data

Mar. 27, 2015    (CN) .......................... 2015 1 0142175

(51) Int. Cl.
    *H01F 27/42*       (2006.01)
    *H01F 37/00*       (2006.01)
                      (Continued)

(52) U.S. Cl.
    CPC .............. *H02J 50/12* (2016.02); *H02J 7/025* (2013.01); *H02J 50/40* (2016.02)

(58) Field of Classification Search
    CPC .. H02J 50/10; H02J 50/12; H02J 50/40; H02J 50/70; H02J 50/80; H02J 50/90;
                      (Continued)

(56) References Cited

U.S. PATENT DOCUMENTS 8,390,249 B2 *   3/2013   Walley ................ H01M 2/0267
                                                                   320/106
9,590,444 B2 *   3/2017   Walley .................... H02J 7/025
                    (Continued)

FOREIGN PATENT DOCUMENTS

CN          101924399 A     12/2010
CN          102347640 A      2/2012
                (Continued)

OTHER PUBLICATIONS

Office Action, including Search Report, for Chinese Patent Application No. 201510142175.0, dated Jun. 12, 2016, 13 pages.

*Primary Examiner* — Lincoln Donovan
*Assistant Examiner* — Diana J Cheng
(74) *Attorney, Agent, or Firm* — Westman, Champlin & Koehler, P.A.

(57) ABSTRACT

The present disclosure relates to a power receiver, a resonance-type contactless power supply and a control method. The power converter is coupled between a receiver-side resonant circuit and a load, and is controlled to adjust a current strength parameter of a high-frequency AC current output from the receiver-side resonant circuit, so that a first current strength parameter, which is a peak or an effective value of a current flowing through a transmitting coil, and a second strength parameter, which is a peak or an effective value of a current flowing through a receiving coil, have a predetermined relationship, and a load impendence of an equivalent load is adjusted, and thus system efficiency is optimized.

10 Claims, 6 Drawing Sheets

(51) Int. Cl.
*H01F 38/00* (2006.01)
*H02J 50/12* (2016.01)
*H02J 7/02* (2016.01)
*H02J 50/40* (2016.01)

(58) Field of Classification Search
CPC .... H02J 7/02; H02J 7/022; H02J 7/025; H02J 7/04; H02J 7/041
USPC .......................................... 307/104; 320/108
See application file for complete search history.

(56) References Cited

U.S. PATENT DOCUMENTS

| | | | | |
|---|---|---|---|---|
| 2012/0112556 | A1* | 5/2012 | Forsell | A61N 1/3787 307/104 |
| 2015/0364927 | A1 | 12/2015 | Yu et al. | |
| 2015/0380944 | A1 | 12/2015 | Yu et al. | |
| 2015/0380947 | A1 | 12/2015 | Zhang et al. | |
| 2015/0380948 | A1 | 12/2015 | Mazaki et al. | |
| 2016/0013663 | A1 | 1/2016 | Zhang et al. | |
| 2016/0036244 | A1* | 2/2016 | Griffith | H04B 5/0031 307/104 |
| 2016/0336784 | A1* | 11/2016 | Yang | H02J 50/40 |

FOREIGN PATENT DOCUMENTS

| | | |
|---|---|---|
| CN | 103138408 A | 6/2013 |
| CN | 104009555 A | 8/2014 |
| CN | 104037956 A | 9/2014 |
| CN | 104065179 A | 9/2014 |
| CN | 104079079 A | 10/2014 |
| CN | 104079081 A | 10/2014 |
| CN | 104682583 A | 6/2015 |
| CN | 104701999 A | 6/2015 |
| JP | 2012-39692 A | 2/2012 |
| JP | 2014-155328 A | 8/2014 |

* cited by examiner

POWER RECEIVER, RESONANCE-TYPE CONTACTLESS POWER SUPPLY AND CONTROL METHOD THEREFOR

CLAIM OF PRIORITY

This application claims priority to Chinese Application No. 201510142175.0, filed on Mar. 27, 2015, which is hereby incorporated by reference.

BACKGROUND OF THE DISCLOSURE

Field of the Disclosure

The present disclosure relates to the field of power electronics, and more particularly, to a power receiver, a resonance-type contactless power supply and a control method.

Description of the Related Art

Contactless power supply is widely used in electronic products, especially in low-power electronic products such as cellular phones, MP3 players, digital cameras, laptop computers, and the like, due to their convenience and availability. A conventional resonance-type contactless power supply typically has a resonance and magnetic coupling circuit including a transmitting coil L1 and a receiving coil L2. The transmitting coil L1 and other components in a power transmitter constitute a transmitter-side resonant circuit. The receiving coil L2 and other components in a power receiver constitute a receiver-side resonant circuit. Electric energy is transferred in a contactless manner when the transmitter-side resonant circuit and the receiver-side resonant circuit have the same resonance frequency. The receiver-side resonant circuit is coupled to the transmitter-side resonant circuit by electromagnetic field, and thus resonates when the transmitter-side resonant circuit resonates. Typically, the above resonance frequency is referred to as a self-inductance resonance frequency.

However, there may be varied load when electric energy is supplied. The conventional contactless power supplies cannot maintain system efficiency while the load varies.

BRIEF DESCRIPTION OF THE DISCLOSURE

In view of this, there is provided a power receiver, a resonance-type contactless power supply and a control method. The resonance-type contactless power supply adjusts a current strength parameter of the receiver-side circuit so as to adjust an output voltage of the power receiver. As a result, an equivalent load impendence is adjusted and the system efficiency is optimized.

According to a first aspect of the disclosure, there is provided a resonance-type contactless power supply, comprising:

a power transmitter, comprising:

an AC current generating circuit configured to generate an AC current having a first current strength parameter;

a transmitter-side resonant circuit comprising a transmitting coil for receiving the AC current and transmitting electric energy; and a transmitter-side control circuit configured to obtain a first signal representing the first current strength parameter and a number of power receivers being coupled to the transmitter-side resonant circuit, and to transfer them wirelessly;

at least one power receiver, comprising:

a receiver-side resonant circuit comprising a receiving coil which is separated from but coupled to the transmitting coil in a contactless manner, and configured to receive electric energy from the transmitting coil;

a rectifier circuit being electrically coupled to the receiver-side resonant circuit;

a power converter being coupled to the rectifier circuit; and a receiver-side control circuit configured to regulate the power converter for maintaining a second current strength parameter to be m times larger than the first current parameter;

wherein $$m = \sqrt{\frac{Rs}{nRd}},$$

the second current strength parameter represents a current strength parameter of an AC current which flows though the receiving coil, Rs is an equivalent resistance of the transmitting coil, Rd is an equivalent resistance of the receiving coil, n is a number of the power receivers, and the current strength parameter is a peak or an effective value of a current.

Preferably, the transmitter-side control circuit comprises:

a first current strength parameter detection circuit configured to detect and to obtain the first signal; and a quantity detection circuit configured to detect a number of the power receivers being coupled to the transmitter-side resonant circuit; and a first wireless communication circuit configured to transfer the first signal and the number of the power receivers wirelessly.

Preferably, the receiver-side control circuit comprises:

a second wireless communication circuit configured to receive the first signal and the number of the power receivers wirelessly.

a signal conversion circuit configured to convert the first signal to a third signal representing a product of the first signal and m;

a second current strength parameter detection circuit configured to detect a current flowing through the receiving coil and to obtain a second signal representing the second current strength parameter;

a compensation circuit configured to generate a compensation signal in response to a difference between the third signal and the second signal; and a control signal generating circuit configured to generate a control signal for controlling the power converter to minimize the compensation signal.

Preferably, the receiver-side control circuit comprises:

a second wireless communication circuit configured to receive the first signal and the number of the power receivers wirelessly.

a second current strength parameter detection circuit configured to detect a current flowing through the receiving coil and to obtain a second signal representing the second current strength parameter;

a signal conversion circuit configured to convert the second signal to a third signal representing a product of the second signal and 1/m;

a compensation circuit configured to generate a compensation signal in response to a difference between the first signal and the third signal;

a control signal generating circuit configured to generate a control signal for controlling the power converter to minimize the compensation signal.

According to a second aspect of the disclosure, there is provided a power receiver being coupled to a power transmitter in a contactless manner and configured to receive electric energy, comprising:

a receiver-side resonant circuit comprising a receiving coil which is separated from but coupled to a transmitting coil of the power transmitter in a contactless manner, and configured to receive electric energy from the transmitting coil;

a rectifier circuit being electrically coupled to the receiver-side resonant circuit;

a power converter being coupled to the rectifier circuit; and a receiver-side control circuit configured to regulate the power converter for maintaining a second current strength parameter to be m times larger than the first current parameter;

wherein $$m = \sqrt{\frac{Rs}{nRd}},$$

the first current strength parameter represents a current strength parameter of an AC current which flows though the transmitting coil, the second current strength parameter represents a current strength parameter of an AC current which flows though the receiving coil, Rs is an equivalent resistance of the transmitting coil, Rd is an equivalent resistance of the receiving coil, n is a number of the power receivers, and the current strength parameter is a peak or an effective value of a current.

Preferably, the receiver-side control circuit comprises:

a second wireless communication circuit configured to receive a first signal representing the first current strength parameter and a number of the power receivers being coupled to the power transmitter wirelessly;

a signal conversion circuit configured to convert the first signal to a third signal representing a product of the first signal and m;

a second current strength parameter detection circuit configured to detect a current flowing through the receiving coil and to obtain a second signal representing the second current strength parameter;

a compensation circuit configured to generate a compensation signal in response to a difference between the third signal and the second signal; and a control signal generating circuit configured to generate a control signal for controlling the power converter to minimize the compensation signal.

Preferably, the receiver-side control circuit comprises:

a second wireless communication circuit configured to receive the first signal and the number of the power receivers wirelessly.

a second current strength parameter detection circuit configured to detect a current flowing through the receiving coil and to obtain a second signal representing the second current strength parameter;

a signal conversion circuit configured to convert the second signal to a third signal representing a product of the second signal and 1/m;

a compensation circuit configured to generate a compensation signal in response to a difference between the first signal and the third signal;

a control signal generating circuit configured to generate a control signal for controlling the power converter to minimize the compensation signal.

According to a third aspect of the disclosure, there is provided a control method for controlling a resonance-type contactless power supply which comprises a power transmitter having a transmitting coil and at least one power receiver having a receiving coil and a power converter, comprising:

regulating the power converter for maintaining a second current strength parameter to be m times larger than the first current parameter;

wherein $$m = \sqrt{\frac{Rs}{nRd}},$$

the first current strength parameter represents a current strength parameter of an AC current which flows though the transmitting coil, the second current strength parameter represents a current strength parameter of an AC current which flows though the receiving coil, Rs is an equivalent resistance of the transmitting coil, Rd is an equivalent resistance of the receiving coil, n is a number of the power receivers, and the current strength parameter is a peak or an effective value of a current.

Preferably, the step of regulating the power converter for maintaining the second current strength parameter to be m times larger than the first current parameter includes obtaining a first signal representing the first current strength parameter, a second signal representing the second current strength parameter and a number of the power receivers being coupled to the power transmitter in a contactless manner;

converting the first signal to a third signal representing a product of the first signal and m; and generating a control signal for controlling the power converter to minimize a difference between the third signal and the second signal.

Preferably, the step of regulating the power converter for maintaining the second current strength parameter to be m times larger than the first current parameter includes obtaining a first signal representing the first current strength parameter, a second signal representing the second current strength parameter and a number of the receiving coils being coupled to the transmitting coil in a contactless manner;

converting the second signal to a third signal representing a product of the second signal and 1/m; and generating a control signal for controlling the power converter to minimize a difference between the first signal and the third signal.

The power converter is coupled between a receiver-side resonant circuit and a load, and is controlled to adjust a current strength parameter of a high-frequency AC current output from the receiver-side resonant circuit, so that a first current strength parameter, which is a peak or an effective value of a current flowing through a transmitting coil, and a second strength parameter, which is a peak or an effective value of a current flowing through a receiving coil, have a predetermined relationship, and a load impendence of an equivalent load is adjusted, and thus system efficiency is optimized.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS
OF THE DISCLOSURE

Reference will now be made in detail to particular embodiments of the disclosure, it will be understood that the scope of the present invention is not limited to these embodiments. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
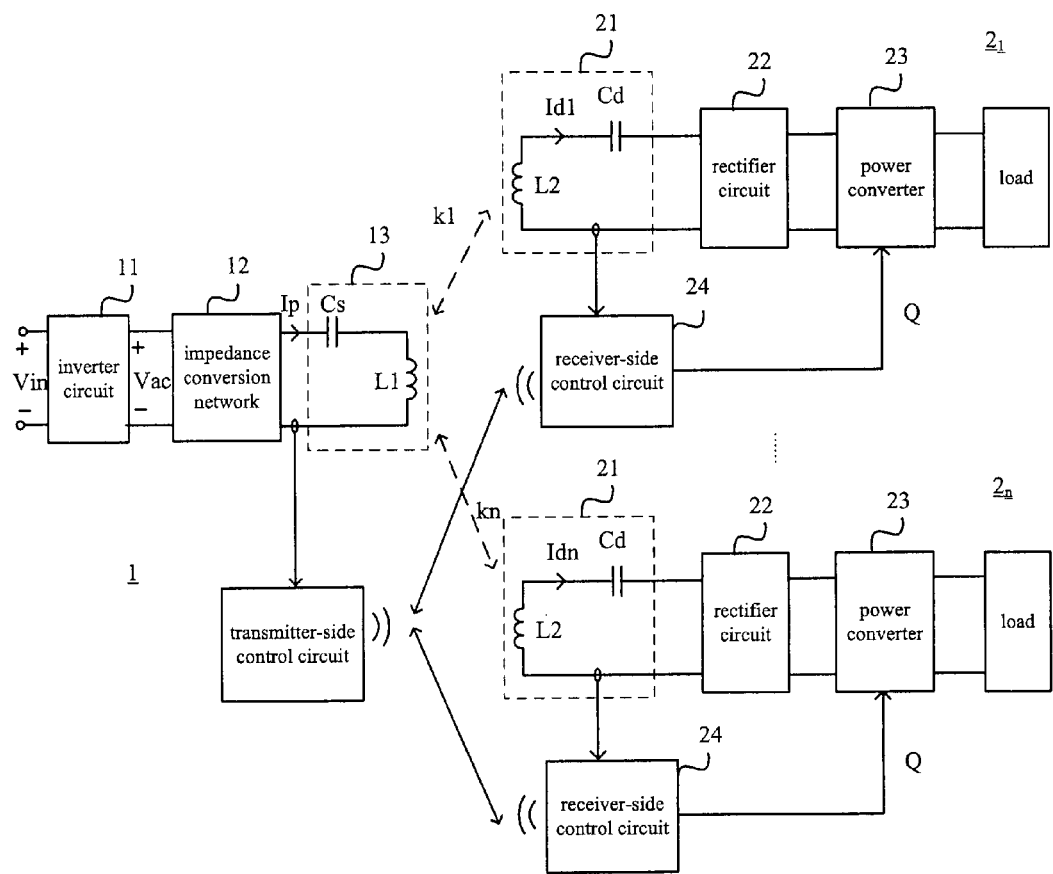
FIG. 1 is a schematic circuit diagram of an example resonance-type contactless power supply according to an embodiment of the present disclosure.

FIG. 1 is a schematic circuit diagram of an example resonance-type contactless power supply according to an embodiment of the present disclosure. As shown in FIG. 1, a resonance-type contactless power supply includes a power transmitter 1 and at least one power receiver 2.

The power transmitter 1 includes an inverter circuit 11, an impendence conversion network 12, a transmitter-side resonant circuit 13 and a transmitter-side control circuit 14.

The power receiver includes a receiver-side resonant circuit 21, a rectifier circuit 22, a power converter 23 and a receiver-side control circuit 24.

The power transmitter 1 and the power receiver 2 are separated from but coupled to each other by the transmitter-side resonant circuit 13 and the receiver-side resonant circuit 21 to transfer electric energy.

In the embodiment, the contactless power supply may also be referred to as a wireless power supply, of which the power transmitter and the power receiver are not dependent on the mode of power transmission of conductor connection to transfer electric energy.

The inverter circuit 11 receives electric energy (for example, a DC current Vin) and generates an AC current Vac with a voltage strength parameter (i.e., a peak or an effective value of a voltage) in response to an inverter control signal.

The inverter circuit may be a full-bridge inverter circuit, a half-bridge inverter circuit, or other inverter circuit having similar functions. In a switching-type inverter circuit, a switching frequency and a phase difference of switches in the switching-type inverter circuit are controlled so as to control a frequency and an amplitude of an AC current Vac.

The impedance conversion network 12 receives the AC current Vac and generates an AC current Ip with a first current strength parameter. The first current strength parameter (i.e., a peak or an effective value of a current) corresponds to a voltage strength parameter of the AC current Vac (i.e., a peak or an effective value of a voltage). That is, the first current strength parameter is determined by the voltage strength parameter of the AC current Vac. Thus, the AC current Ip, which is fed into the transmitter-side resonant circuit 13, has a current strength parameter which is controlled by the voltage strength parameter output from the inverter circuit. Further, it is equivalent to a circuit in which a constant AC current source is connected to an input port of the transmitter-side resonant circuit 13, and the current strength parameter of the AC current source can be adjusted. In the embodiment, the inverter circuit 11 and impendence conversion network 12 are cascaded to form the AC current generating circuit which generates the AC current Ip with the first current strength parameter. The first current strength parameter doesn't vary with the load. Obviously, there are other types of AC current generating circuits which can generate an AC current to feed into the transmitter-side resonant circuit 13.

The transmitter-side resonant circuit 13 includes a transmitting coil L1 for receiving the AC current Ip. Thus, the first current strength parameter represents the current strength parameter of the AC current flowing through the transmitting coil L1.

The transmitter-side resonant circuit 13 needs an additional transmitter-side resonance capacitor Cs which is connected in series or in parallel with the transmitting coil L1 to provide a resonance circuit. The transmitter-side resonance capacitor Cs is used for balancing inductive reactance of the transmitting coil L1 in the transmitter-side resonant circuit 13, and inductive reactance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonance capacitor so that an additional capacitor can be omitted in the circuit.

The receiver-side resonant circuit 21 includes a receiving coil L2 in the power receiver 2. The receiving coil L2 is coupled to the transmitting coil L2 in the transmitter-side resonant circuit 13 in a detachable and contactless manner. The receiver-side resonant circuit 13 receives electric energy from the transmitting coil L1.

Meanwhile, the receiver-side resonant circuit 21 needs an additional receiver-side resonant capacitor Cd for decreasing reactive power at a receiver side and increasing active power transferred by the resonance and magnetic coupling circuit. As mentioned above, distributed capacitance (for example, among wires of the coil) of other components in the circuit may be used as the receiver-side resonant capacitor Cd so that an additional capacitor can be omitted in the circuit.

The transmitter-side resonant circuit 13 and the receiver-side resonant circuit 21 constitute the resonance and magnetic coupling circuit.

In the embodiment, a power transmitter 1 can be coupled to many power receivers, for example $2_1$-$2_n$, respectively, and transfer electric energy to a plurality of power receivers.

In the power receiver $2_i$, the rectifier circuit 22 is coupled to the receiver-side resonant circuit 21 for rectifying an AC current Id generated by the receiver-side resonant circuit 21 by resonant induction to a DC current.

The power converter 23 is coupled to the rectifier circuit 22 for adjusting the load power in accordance with the control of the receiver-side control circuit 24.

In a preferable embodiment, the load is a battery, and the power converter 23 may be a charger having adjustable output power.

The rectifier circuit 22, the power converter 23 and the load are cascaded to form a cascade circuit which is equivalent to a load RL in the receiver-side resonant circuit 21.

Figure 2:
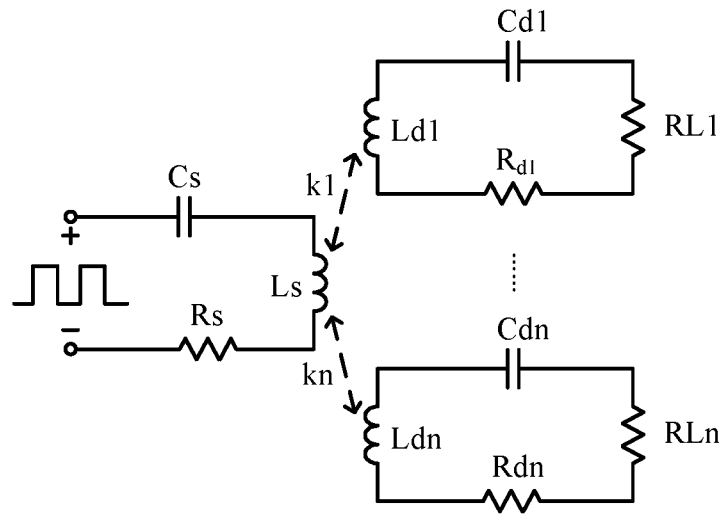
FIG. 2 is a schematic diagram showing a resonance and magnetic coupling circuit in the example resonance-type contactless power supply according to an embodiment of the present disclosure.

FIG. 2 is an equivalent circuit diagram of a resonance and magnetic coupling circuit, i.e., a combination of a transmitter-side resonant circuit 13 and a receiver-side resonant circuit 21, in the example resonance-type contactless power supply according to an embodiment of the present disclosure.

As shown in FIG. 2, the transmitting coil L1 is equivalent to a first ideal coil Ls and a coil resistor Rs, and the receiving coil L2 is equivalent to a second ideal coil Ld and a coil resistor Rd. The first ideal coil Ls is coupled to the second ideal coil Ld. In FIG. 2, the transmitter-side resonant circuit 13 and the receiver-side resonant circuit 21 are each series resonance circuits. The transmitter-side resonant circuit 13 further includes a transmitter-side resonance capacitor Cs, and the receiver-side resonant circuit 21 further includes a receiver-side resonant capacitor Cd. As mentioned above, the transmitter-side resonance capacitor Cs and the receiver-side resonant capacitor Cd may be achieved by additional components or distributed parameters of other components.

Thus, the resonance and magnetic coupling circuit constitutes a mutual-inductance coupling circuit.

Typically, the transmitter-side resonant circuit 13 and the receiver-side resonant circuit 21 have the same resonance frequency so that electric energy can be transferred in a resonant manner as follows, $$fs = 1/2\pi \cdot \sqrt{Ls \cdot Cs} = 1/2\pi \cdot \sqrt{Ld \cdot Cd} = fd$$

wherein fs is a resonance frequency of the transmitter-side resonant circuit 13, fd is a resonance frequency of the receiver-side resonant circuit 14, Ls is an inductance value of the first ideal coil Ls, Ld is an inductance value of the second ideal coil Ld, Cs is a capacitance value of the transmitter-side resonance capacitor, and Cd is a capacitance value of the receiver-side resonant capacitor.

Preferably, the inductance value of the first ideal coil Ls may be set to be equal to the inductance value of the second ideal coil Ld, and the capacitance value Cs of the transmitter-side resonance capacitor may be set to be equal to the capacitance value Cd of the receiver-side resonant capacitor so that the receiver-side resonant capacitor 13 and the receiver-side resonant circuit 14 have the same resonance frequency. Thus, if there is n power receivers, the receiver-side resonant circuits in the power receivers have the same parameters, that is, $$Ld1 = Ld2 = \ldots = Ldn = Ld$$

$$Cd1 = Cd2 = \ldots = Cdn = Cd$$

$$Rd1 = Rd2 = \ldots = Rdn = Rd$$

Typically, the above resonance frequency is referred to as a self-inductance resonance frequency. When operating at the above resonance frequency, the transmitter-side resonant capacitor 13 and the receiver-side resonant circuit 21 resonate simultaneously, and impedances of inductors and capacitors in the resonance and magnetic coupling circuit are canceled out. The system efficiency is thus optimized.

For detailed analysis of the resonance and magnetic coupling circuit, the ideal coils Ls and Ld are decoupled to a transmitter-side leakage inductance Ls', a receiver-side leakage inductance Ld', and a mutual inductance Lm. Because the power receivers 2 may have different relative locations with respect to the power transmitter 1, the receiver-side resonant circuits 21 in the power receivers 2 and the transmitter-side resonant circuit 22 in the power transmitter 1 are coupled with different coupling coefficients ki(i=1~n). Consequently, the mutual inductance $Lm_i$ may be different with each other after decoupling.

In FIG. 2, a series circuit of the transmitter-side leakage inductance Ls' and the transmitter-side resonance capacitor Cs has an equivalent impedance $-j\omega_0 Lm$ when the transmitter-side resonant circuit 13 provides an AC current Ip with a self-inductance resonance frequency $\omega_0$. Thus, the impedance of the mutual inductance can be canceled out. An input port of the power transmitter has minimized impedance, and the transmitter-side resonant circuit resonates. Meanwhile, a series circuit of the receiver-side leakage inductance Ld' and the receiver-side resonant capacitor Cd has an equivalent impedance $-j\omega_0 Lm$, so that an output port of the power receiver has a minimized impedance, and the receiver-side resonant circuit resonates.

Figure 3:
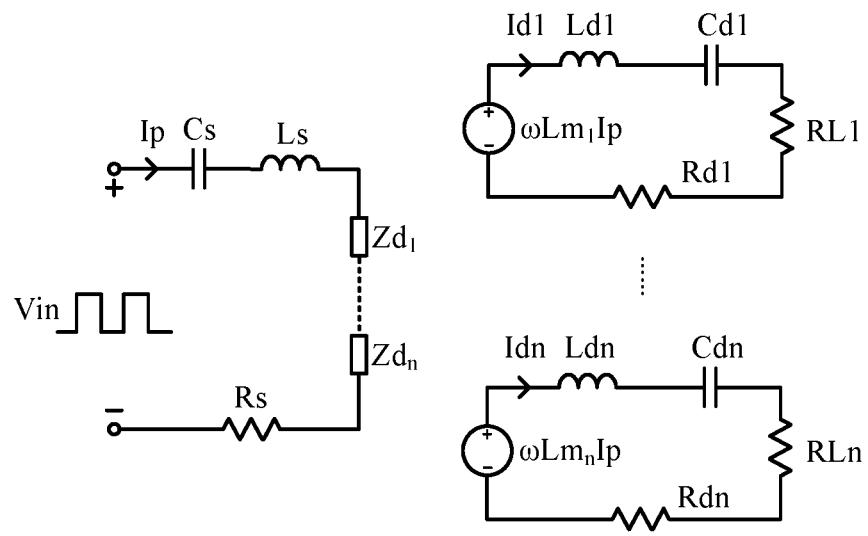
FIG. 3 is an equivalent circuit diagram of a resonance and magnetic coupling circuit in a decoupling state in the example resonance-type contactless power supply according to an embodiment of the present disclosure.

FIG. 3 is an equivalent circuit diagram of a resonance and magnetic coupling circuit in a decoupling state in the example resonance-type contactless power supply according to an embodiment of the present disclosure. In the resonance and magnetic coupling circuit according to the embodiment, an input terminal of the transmitter-side resonant circuit 13 is equivalent to a circuit being coupled to an AC current source with a constant current parameter. According to a current-voltage relationship in the mutual inductance coupling, the receiver-side resonant circuit generates an AC current with a constant voltage strength (for example, a constant voltage peak) by mutual inductance coupling when an AC current with a constant current strength (for example, a constant current peak) is fed to the transmitter-side resonant circuit. Thus, the transmitter-side circuit is equivalent to a circuit which is coupled to an AC voltage source at the input terminal of the receiver-side circuit and provides an AC current with a voltage equal to $\omega_0 Lm_i Ip$. Meanwhile, the receiver-side circuit and the load are equivalent to the reflection impedances $Zd_1 \sim Zd_n$ coupled in series with each other at the output terminal of the transmitter-side circuit.

The receiver-side circuit provides a voltage approximately equal to $\omega_0 Lm_i Ip$ in the equivalent circuit as shown in FIG. 2. Thus, when operating at the self-inductance resonance frequency $$f = \frac{1}{2\pi\sqrt{LsCs}},$$

the reflection impedance $Zd_i$ satisfies, $$Zd_i = \frac{(\omega Lm_i)^2}{RL_i + Rd},$$

wherein $Lm_i = k_i\sqrt{LsLd}$, ki is a coupling coefficient between the receiving coil of the (i)th power receiver $2_i$ and the transmitting coil of the power transmitter 1, and $Lm_i$ is a mutual inductance.

When the power receivers $2_1 \sim 2_n$ have the same inductor current in the receiving coils, the system efficiency $\eta$ satisfies, $$\eta = \frac{RL_1 + RL_2 + \ldots + RL_n}{Rd\left(\frac{RL_n + Rd}{\omega Lm_n}\right)^2 + RL_1 + RL_2 + \ldots + RL_n + nRd}$$

Thus, when the system efficiency is maximized, the (i)th power receiver $2_i$ has an equivalent load impedance $Rl_i$ which satisfies, $$RL_i \approx \sqrt{\frac{nRd}{Rs}} \omega Lm_i,$$

When the load impendence is an optimal impendence, the current Id of the receiver-side resonant circuit satisfies, $$Id = Id_i \approx \frac{\omega Lm_i Ip}{\omega Lm_i \sqrt{\frac{nRd}{Rs}}} = \sqrt{\frac{Rs}{nRd}} Ip,$$

that is, Id=mIp, wherein $$m = \sqrt{\frac{Rs}{nRd}}$$

From the above equations, it can be understood that the receiver-side equivalent load resistance becomes optimal so that the system operates at an optimal efficiency, if the current strength parameter of the AC current fed to the transmitter-side resonant circuit has a predetermined relationship with the current strength parameter of the AC current of the receiver-side resonant circuit.

On the basis of the above principles, the transmitter-side control circuit 14 obtains the first signal S1 representing the first current strength parameter and the number n of the power receivers being coupled to the transmitter-side resonant circuit 13, and transfers them wirelessly. The receiver-side control circuit 24 receives the current strength parameter of the current flowing through the transmitting coil, i.e., the first current strength parameter, and the number n of the power receivers being coupled to the power transmitter from the transmitter-side control circuit 14. The power converter 23 is regulated in accordance with these parameters to control the current Id flowing through the receiver-side resonant circuit 21 and the current Ip flowing through the transmitting-side resonant circuit 13 to have the above predetermined relationship, and thus the system efficiency is optimized.

Figure 4:
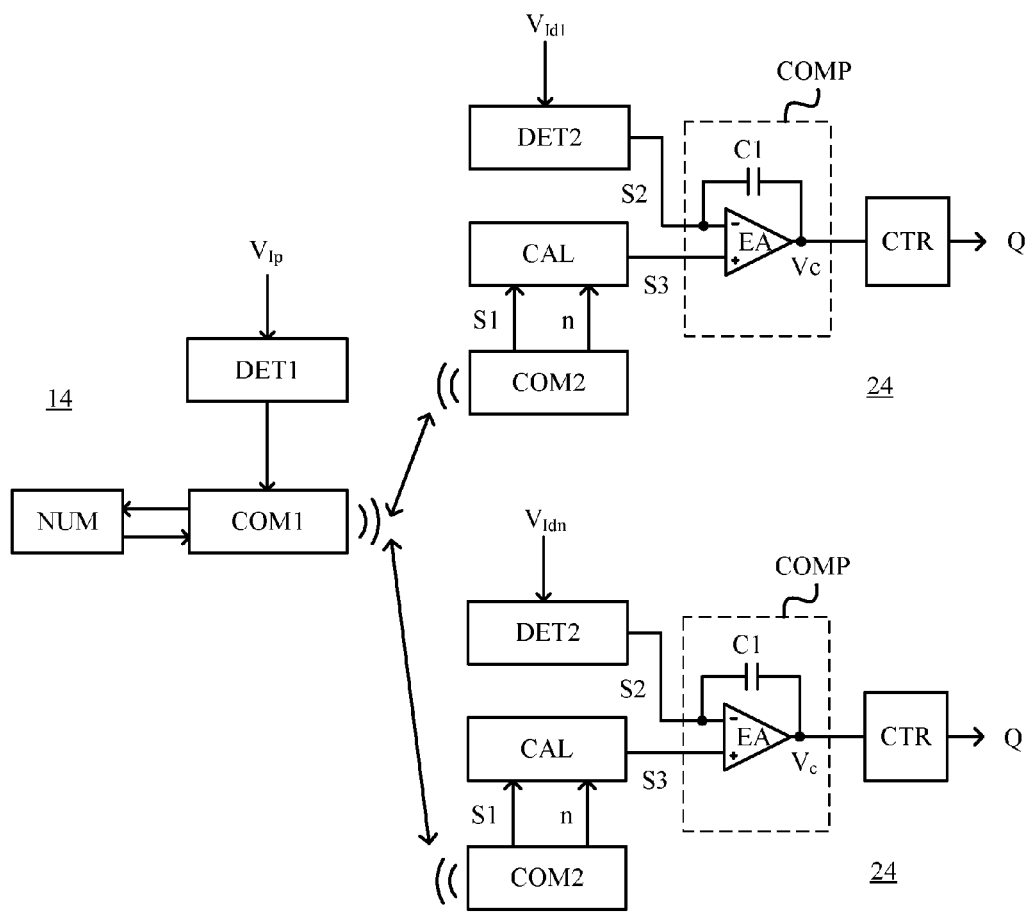
FIG. 4 is a schematic circuit diagram of a control circuit according to an embodiment of the present disclosure.

FIG. 4 is a schematic circuit diagram of a control circuit according to an embodiment of the present disclosure. As shown in FIG. 4, the receiver-side control circuit 14 includes a first current strength parameter detection circuit DET1, a quantity detection circuit NUM and a first wireless communication circuit COM1.

The first current strength parameter detection circuit DET1 detects a current flowing through the transmitting coil L1, and obtains a detection value $V_{Ip}$ and a first signal S1 representing a first current strength parameter.

The quantity detection circuit NUM detects a number of the power receivers being coupled to the transmitter-side resonant circuit 13. The quantity detection circuit NUM obtains the number by communication with the power receivers, or by a distance or a photo sensor. It can be understood that any prior circuits for obtaining the number of the power receivers can be applicable to the embodiment of the disclosure.

The first wireless communication circuit transfers the first signal S1 and the number n of the power receivers wirelessly. The wireless manner can be radio communication, optical communication or other communication approaches.

The receiver-side control circuit 24 includes a second wireless communication circuit COM2, a signal conversion circuit CAL, a second current strength parameter detection circuit DET2, a compensation circuit COMP and a control signal generating circuit CTR.

The second wireless communication circuit COM2 receives the first signal S1 and the number n of the power receivers wirelessly.

The signal conversion circuit CAL converts a first signal S1 to a third signal S3 which represents a product of the first signal S1 and m. The m is obtained by calculating the known parameters Rs, Rd and the number n received by the second wireless communication circuit COM2.

The second current strength parameter detection circuit DET2 detects a current flowing through the receiving coil L2 and obtains a second signal S2 representing the second current strength parameter.

The compensation circuit COMP generates a compensation signal in response to a difference S3−S2 between the third signal S3 and the second signal S2.

The control signal generating circuit CTR generates a control signal Q for controlling the power converter 23 to minimize the compensation signal Vc.

It should be understood that minimization here means to minimize the amplitude of the compensation signal Vc so that it can be as close to zero as possible.

The power converter 23 may be a switching-type or a linear power converters, which is controlled by a control signal Q to regulate an equivalent impendence of the power converter 23 and the load, so that the system has an optimal efficiency.

Figure 5:
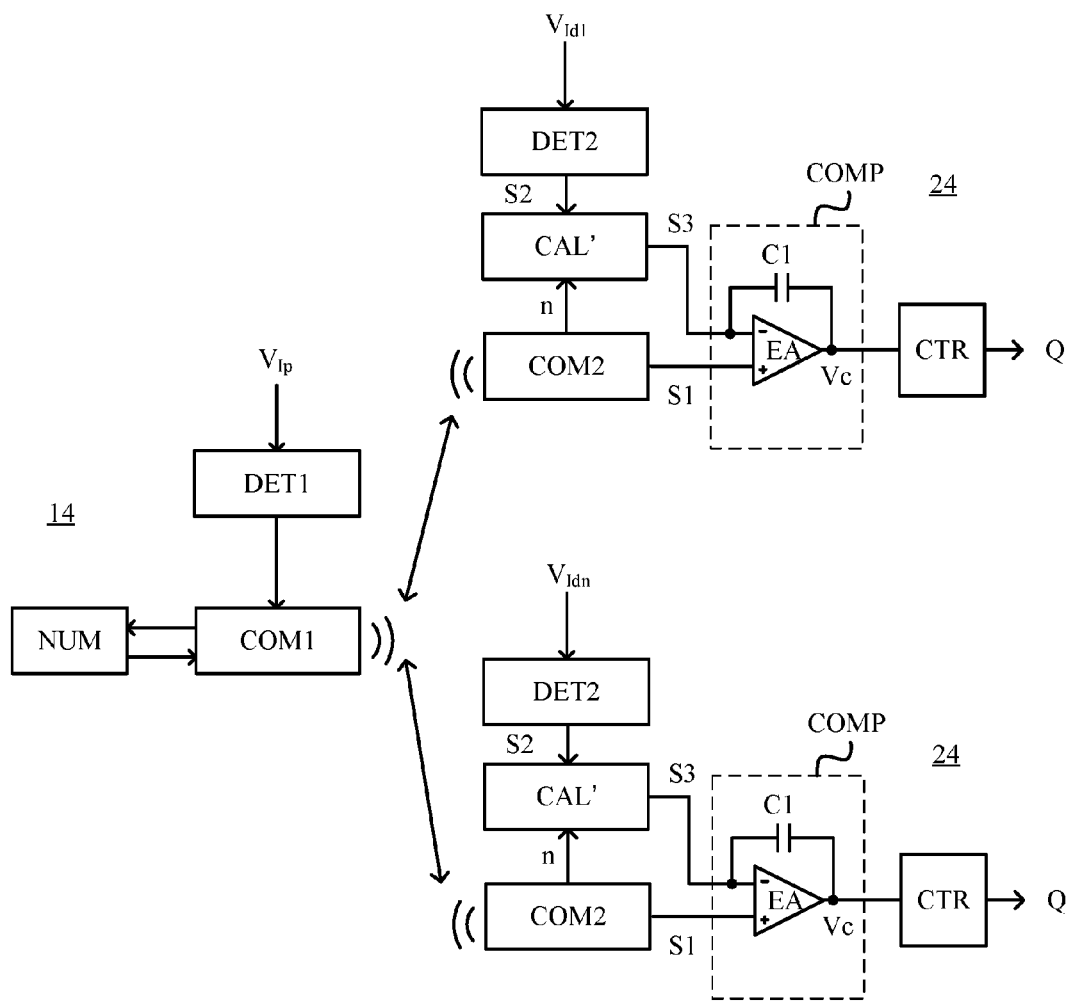
FIG. 5 is a schematic circuit diagram of a control circuit according to an embodiment of the present disclosure.

FIG. 5 is a schematic circuit diagram of a control circuit according to an embodiment of the present disclosure. As shown in FIG. 5, the transmitter-side control circuit 14 has the same structure as that in FIG. 4, and will not be further described here. The receiver-side control circuit 24 includes a second wireless communication circuit COM2, a second current strength parameter detection circuit DET2, a signal conversion circuit CAL', a compensation circuit COMP and a control signal generating circuit CTR.

The second wireless communication circuit COM2 receives the first signal S1 and the number n of the power receivers wirelessly.

The second current strength parameter detection circuit DET2 detects the sampling signals $V_{Idi}$(i=1~n) of a current flowing through the receiving coil L2 and obtains a second signal S2 representing the second current strength parameter.

The signal conversion circuit CAL' is different from the receiver-side control circuit shown in FIG. 4, which converts the second signal S2 to a third signal S3. The third signal S3 represents a product of the second signal S2 and 1/m. That is, the signal conversion circuit CAL' calculates $S1*n^{1/2}*(Rd/Rs)^{1/2}$ and outputs it as the third signal S3. Because the second signal represents the second current strength parameter, i.e., the current strength parameter of an AC current Id flowing through the receiving coil L2, the third signal S3 represents Id/m.

The compensation circuit COMP generates a compensation signal in response to a difference between the first signal S1 and the third signal S3. Thus, the compensation signal Vc represents Id/m−Ip. Minimizing Vc is to control the current Id and Ip to satisfy the equation Id=mIp, so that the system efficiency is optimized.

The control signal generating circuit CTR generates a control signal Q for controlling the power converter 23 to minimize the compensation signal.

It should be understood that here that minimization is to minimize the amplitude of the compensation signal Vc so that it can be as close to zero as possible.

The power converter 23 may be a switching-type or a linear power converter, which is controlled by a control signal Q to regulate an equivalent impendence of the power converter 23 and the load, so that the system has an optimal efficiency.

The transmitter-side control circuit and the receiver-side control circuit in FIG. 1 cooperate with each other as following control method to achieve optimized efficiency. The control method includes regulating the power converter for maintaining a second current strength parameter to be m times larger than the first current parameter,
wherein $$m = \sqrt{\frac{Rs}{nRd}},$$

the first current strength parameter is a current strength parameter of an AC current flowing through the transmitting coil, the second current strength parameter is a current strength parameter of an AC current flowing through the receiving coil, Rs is an equivalent resistance of the transmitting coil, Rd is an equivalent resistance of the receiving coil, and n is a number of the power receivers.

Figure 6:
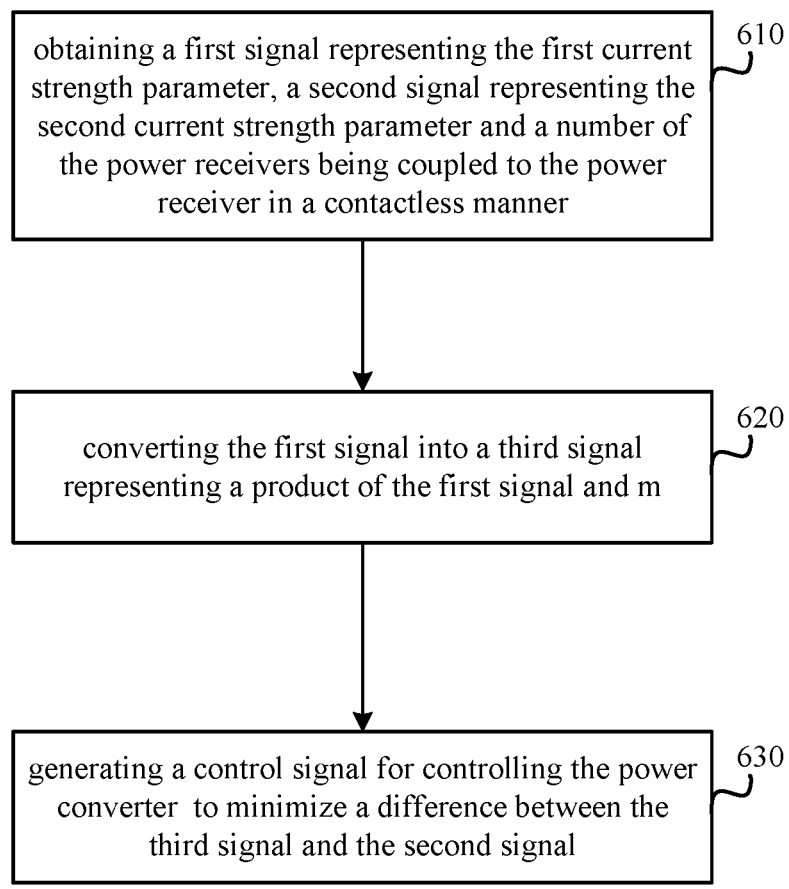
FIG. 6 is a flow chart of an example control method according to an embodiment of the present disclosure.

FIG. 6 is a flow chart of an example control method according to an embodiment of the present disclosure. As shown in FIG. 6, the step of regulating the power converter for maintaining a second current strength parameter to be m times larger than the first current parameter includes:

in step 610, a first signal representing the first current strength parameter, a second signal representing the second current strength parameter and a number of the power receivers being coupled to the power receiver in a contactless manner, are obtained;

in step 620, the first signal is converted into a third signal representing a product of the first signal and m; and in step 630, a control signal for controlling the power converter is generated to minimize a difference between the third signal and the second signal.

The control method shown in FIG. 6 is a control process of the control circuit shown in FIG. 4.

Figure 7:
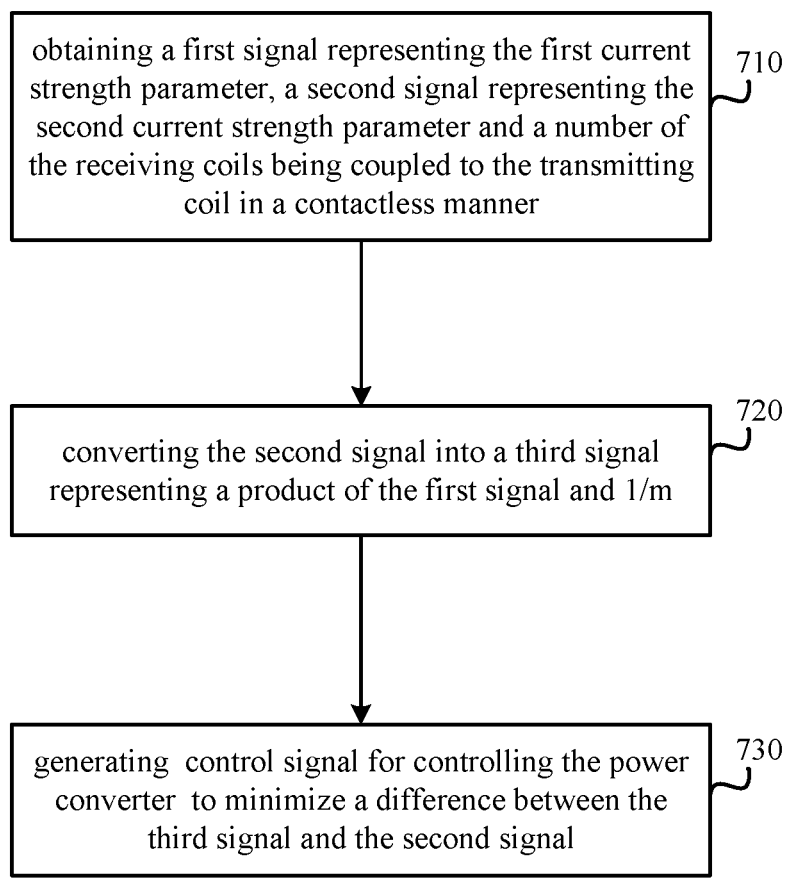
FIG. 7 is a flow chart of an example control method according to an embodiment of the present disclosure.

FIG. 7 is a flow chart of an example control method according to an embodiment of the present disclosure. As shown in FIG. 7, the step of regulating the power converter for maintaining a second current strength parameter to be m times larger than the first current parameter includes:

in step 710, a first signal representing the first current strength parameter, a second signal representing the second current strength parameter and a number of the receiving coils being coupled to the transmitting coil in a contactless manner, are obtained, in step 720, the second signal is converted into a third signal representing a product of the first signal and 1/m, and in step 730, a control signal for controlling the power converter is generated to minimize a difference between the third signal and the second signal.

The control method shown in FIG. 7 is a control process of the control circuit shown in FIG. 4.

The power converter is coupled between a receiver-side resonant circuit and a load, and is controlled to adjust a current strength parameter of a high-frequency AC current output from the receiver-side resonant circuit, so that a first current strength parameter, which is a peak or an effective value of a current flowing through a transmitting coil, and a second strength parameter, which is a peak or an effective value of a current flowing through a receiving coil, have a predetermined relationship, and a load impendence of an equivalent load is adjusted, and thus system efficiency is optimized.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A resonance-type contactless power supply comprising:
a power transmitter, comprising:
an AC current generating circuit configured to generate an AC current having a first current strength parameter;
a transmitter-side resonant circuit comprising a transmitting coil for receiving said AC current and transmitting electric energy; and
a transmitter-side control circuit configured to obtain a first signal representing said first current strength parameter and a number of power receivers being coupled to said transmitter-side resonant circuit, and to transfer them wirelessly;

at least one power receiver, comprising:
a receiver-side resonant circuit comprising a receiving coil which is separated from but coupled to said transmitting coil in a contactless manner, and configured to receive electric energy from said transmitting coil;
a rectifier circuit being coupled to said receiver-side resonant circuit;
a power converter being coupled to said rectifier circuit; and
a receiver-side control circuit configured to regulate said power converter for maintaining a second current strength parameter to be m times larger than said first current parameter,
wherein $$m = \sqrt{\frac{Rs}{nRd}},$$

said second current strength parameter represents a current strength parameter of an AC current which flows though said receiving coil, Rs is an equivalent resistance of said transmitting coil, Rd is an equivalent resistance of said receiving coil, n is a number of said power receivers, and said current strength parameter is a peak or an effective value of a current.

2. The resonance-type contactless power supply according to claim 1, wherein said transmitter-side control circuit comprises:
a first current strength parameter detection circuit configured to detect and to obtain said first signal;
a quantity detection circuit configured to detect a number of said power receivers being coupled to said transmitter-side resonant circuit; and
a first wireless communication circuit configured to transfer said first signal and said number of said power receivers wirelessly.

3. The resonance-type contactless power supply according to claim 2, wherein said receiver-type control circuit comprises:
a second wireless communication circuit configured to receive said first signal and said number of said power receivers.
a signal conversion circuit configured to convert said first signal to a third signal representing a product of said first signal and m;
a second current strength parameter detection circuit configured to detect a current flowing through said receiving coil and to obtain a second signal representing said second current strength parameter;
a compensation circuit configured to generate a compensation signal in response to a difference between said third signal and said second signal; and
a control signal generating circuit configured to generate a control signal for controlling said power converter to minimize said compensation signal.

4. The resonance-type contactless power supply according to claim 2, wherein said receiver-type control circuit comprises:
a second wireless communication circuit configured to receive said first signal and said number of said power receivers wirelessly;
a second current strength parameter detection circuit configured to detect a current flowing through said receiving coil and to obtain a second signal representing said second current strength parameter;
a signal conversion circuit configured to convert said second signal to a third signal representing a product of said second signal and 1/m;
a compensation circuit configured to generate a compensation signal in response to a difference between said first signal and said third signal;
a control signal generating circuit configured to generate a control signal for controlling said power converter to minimize said compensation signal.

5. A power receiver being coupled to a power transmitter in a contactless manner and configured to receive electric energy, comprising:
a receiver-side resonant circuit comprising a receiving coil which is separated from but coupled to a transmitting coil of said power transmitter in a contactless manner, and configured to receive electric energy from said transmitting coil;
a rectifier circuit being coupled to said receiver-side resonant circuit;
a power converter being coupled to said rectifier circuit; and
a receiver-side control circuit configured to regulate said power converter for maintaining a second current strength parameter to be m times larger than said first current parameter,
wherein $$m = \sqrt{\frac{Rs}{nRd}},$$

said first current strength parameter represents a current strength parameter of an AC current which flows though said transmitting coil, said second current strength parameter represents a current strength parameter of an AC current which flows though said receiving coil, Rs is an equivalent resistance of said transmitting coil, Rd is an equivalent resistance of said receiving coil, n is a number of said power receivers, and said current strength parameter is a peak or an effective value of a current.

6. The power receiver according to claim 5, wherein said receiver-side control circuit comprises:
a second wireless communication circuit configured to receive a first signal representing said first current strength parameter and a number of said power receivers being coupled to said power transmitter wirelessly;
a signal conversion circuit configured to convert said first signal to a third signal representing a product of said first signal and m;
a second current strength parameter detection circuit configured to detect a current flowing through said receiving coil and to obtain a second signal representing said second current strength parameter;
a compensation circuit configured to generate a compensation signal in response to a difference between said third signal and said second signal; and
a control signal generating circuit configured to generate a control signal for controlling said power converter to minimize said compensation signal.

7. The power receiver according to claim 5, wherein said receiver-side control circuit comprises:

a second wireless communication circuit configured to receive said first signal and said number of said power receivers wirelessly;

a second current strength parameter detection circuit configured to detect a current flowing through said receiving coil and to obtain a second signal representing said second current strength parameter;

a signal conversion circuit configured to convert said second signal to a third signal representing a product of said second signal and 1/m;

a compensation circuit configured to generate a compensation signal in response to a difference between said first signal and said third signal; and a control signal generating circuit configured to generate a control signal for controlling said power converter to minimize said compensation signal.

8. A control method for controlling a resonance-type contactless power supply which comprises a power transmitter having a transmitting coil and at least one power receiver having a receiving coil and a power converter, comprising:

regulating said power converter for maintaining a second current strength parameter to be m times larger than said first current parameter;

wherein $$m = \sqrt{\frac{Rs}{nRd}},$$

said first current strength parameter represents a current strength parameter of an AC current which flows though said transmitting coil, said second current strength parameter represents a current strength parameter of an AC current which flows though said receiving coil, Rs is an equivalent resistance of said transmitting coil, Rd is an equivalent resistance of said receiving coil, n is a number of said power receivers, and said current strength parameter is a peak or an effective value of a current.

9. The control method according to claim 8, wherein said step of regulating said power converter for maintaining said second current strength parameter to be m times larger than said first current parameter comprises:

obtaining a first signal representing said first current strength parameter, a second signal representing said second current strength parameter and a number of said power receivers being coupled to said power transmitter in a contactless manner;

converting said first signal to a third signal representing a product of said first signal and m; and generating a control signal for controlling said power converter to minimize a difference between said third signal and said second signal.

10. The control method according to claim 8, wherein said step of regulating said power converter for maintaining said second current strength parameter to be m times larger than said first current parameter comprises:

obtaining a first signal representing said first current strength parameter, a second signal representing said second current strength parameter and a number of said receiving coils being coupled to said transmitting coil in a contactless manner;

converting said second signal to a third signal representing a product of said second signal and 1/m; and generating a control signal for controlling said power converter to minimize a difference between said first signal and said third signal.

* * * * *